Patented Jan. 16, 1923.

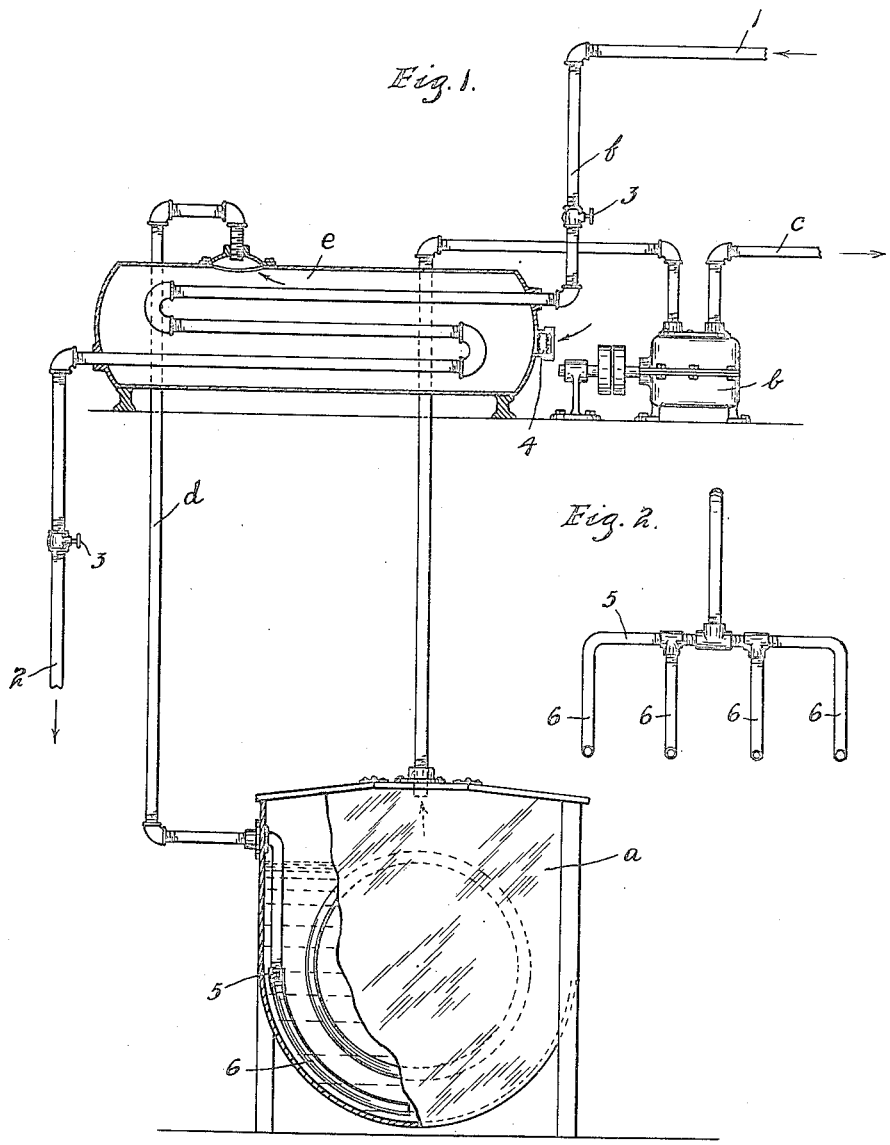

1,442,336

UNITED STATES PATENT OFFICE.

JOHN T. HANNA AND LAWRENCE E. COON, OF HUDSON, WISCONSIN; SAID COON ASSIGNOR TO SAID HANNA.

APPARATUS FOR TREATING CREAM, ETC.

Application filed November 3, 1920. Serial No. 421,455.

*To all whom it may concern:*

Be it known that we, JOHN T. HANNA and LAWRENCE E. COON, citizens of the United States, residing at Hudson, in the county of Saint Croix and State of Wisconsin, have invented certain new and useful Improvements in Apparatus for Treating Cream, Etc.; and we do hereby declare the following to be a full, clear, and exact description of the invention, such as will enable others skilled in the art to which it appertains to make and use the same.

This invention relates to the art of treating cream or milk. As is well known to those skilled in this art, cream before being made into butter is preliminarily treated in what is known as the cream ripener, which consists usually of a closed vessel, having heating coils passing therethrough. The different batches of cream received at the creamery vary greatly as to their quality and condition and it has been found impossible to secure good results by giving all grades of cream the same treatment. In order to avoid a grainy or otherwise imperfect butter product, it has been customary to add certain purifying agents to the cream, such as lime, soda, wood lime, etc., depending upon the specific condition thereof.

It is an object of this invention therefore to provide a simple and efficient method and apparatus for treating creams of various qualities and conditions, so that a satisfactory and substantial uniform product will be obtained.

It is also a further object of the invention to provide such method and apparatus, whereby the use of purifying agents during the pasteurization process is eliminated.

These and other objects and advantages of the invention will become apparent from the following description made in connection with the accompanying drawings, in which like reference characters refer to the same parts throughout the different views, and in which Fig. 1 is a somewhat diagrammatic view of one form of apparatus used; and Fig. 2 is a view in elevation of one of the details of such apparatus.

Referring to the drawings:

An ordinary commercial cream ripener is illustrated as $a$, which is shown as having therein the usual heating coil. Connected at the top of the member $a$ is a pipe which forms the intake pipe of an air pump $b$, the discharge pipe or conduit for the same being shown as $c$. Another pipe $d$ is shown as communicating with the ripener $a$ and this pipe communicates with a tank or vessel $e$.

The vessel $e$ which is shown as an elongated cylindrical tank forms an air heating chamber and has a series of pipe coils therein through which steam is passed. The inlet end of the pipe is shown as 1 and the outlet as 2 and the pipe is arranged to be connected to any convenient source of steam supply. Suitable valves 3 are shown for controlling the supply of steam. The tank $e$ is shown as having an opening at one end and this opening is arranged to receive any suitable type of air purifier which may be either a gauze or screen purifier or some form of chemical or liquid purifier. The pipe $d$ enters the vessel $a$ at one side and near the top thereof and is connected to a manifold or distributing pipe 5, which has the outlet pipe 6 connected thereto and in communication therewith. Pipes 6 extend along one side of the member $a$ as shown in Fig. 1 and have their outlet ends disposed at separated points centrally of and near the bottom of said member.

The pump $b$ may be of any desired commercial type which is adapted to create a suction in the intake conduit thereof and this pump is shown in Fig. 1 as having the usual tight and loose pulleys by means of which it is driven by a suitably connected belt.

While the air heating tank $e$ is shown above the member $a$ it will, of course, be understood that parts in actual practice will probably be all arranged on one level, the arrangement of the drawings merely being selected for illustration. It will be also understood that the apparatus shown is largely diagrammatic and merely intended to represent the various types of apparatus which will be used.

In operation, the cream will be placed in the ripener $a$ to approximately the level indicated in Fig. 1 and live steam will be turned into the pipe $f$, so that the steam coils in vessel $e$ and the air therein and passing therethrough will be heated to considerably high temperature. The pump $b$ will now be started and air will be drawn through the intake thereof which communicates with the top of vessel *a*. A lowered pressure or suction will be created in the top of vessel *a* and air will be drawn through the pipes 6 and the pipe *d* from the air heating tank *e*. Fresh air will be drawn through the vessel *e* through the air purifier 4 which air in turn will be heated in said vessel and be drawn through the pipe *d*. In this manner, heated and purified air is drawn through the cream in the ripener *a*. The degree of vacuum maintained in the top of the ripener *a* will not be sufficient to draw any of the cream through the outlet pipe and into the pump.

By thus treating the cream with heated and purified air, it has been found that the quality thereof is greatly improved and the difficulty experienced by the same forming grainy or otherwise imperfect butter is eliminated. If the cream comes to the ripener slightly sour, the same will be sweetened and improved by treating with the air for a suitably determined period. The milk or cream in the ripener can also be by this method evaporated to any desired percentage of solid matter. By suitably varying the period of treatment, milk and cream of different degrees of condition and quality can be made substantially uniform and greatly improved for the subsequent butter making process. The temperature of the air used can be varied as desired by means of the steam controlling valves 3, and is preferably sufficient to kill the bacteria in the air which is thus purified.

It will thus be seen that the applicants have invented a simple and efficient method for improving the quality and condition of milk or cream, and this method has shown remarkable results in actual practice. It will be, of course, understood that various changes in the form and details of the applicants' apparatus and the steps of their method can be made without departing from the scope of the invention, which generally stated consists in the matter shown and described and set forth in the appended claim.

What is claimed is:

An apparatus for treating milk and cream comprising a cream ripener having therein the usual heating coil, a series of spaced parallel pipes extending from the top of said ripener downwardly along the sides to a point centrally of the bottom thereof where they are provided with open ends, means for drawing air out of the top of said ripener, and means for supplying heated air to said series of pipes whereby the heated air is drawn through the milk or cream in the ripener.

In testimony whereof we affix our signatures in presence of two witnesses.

JOHN T. HANNA.
LAWRENCE E. COON.

Witnesses:
N. O. VARNUM,
FAE GRIDLEY.